(12) United States Patent
Rohwer et al.

(10) Patent No.: US 7,731,051 B2
(45) Date of Patent: Jun. 8, 2010

(54) HYDROGEN PRESSURE TANK INCLUDING AN INNER LINER WITH AN OUTER ANNULAR FLANGE

(75) Inventors: Thorsten Rohwer, Trebur (DE); Ingo Hermann, Mainz (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1242 days.

(21) Appl. No.: 11/180,427

(22) Filed: Jul. 13, 2005

(65) Prior Publication Data

US 2007/0012551 A1    Jan. 18, 2007

(51) Int. Cl.
F17C 1/02 (2006.01)
F17C 13/06 (2006.01)
B65D 6/40 (2006.01)
B65D 53/02 (2006.01)
F17C 1/00 (2006.01)

(52) U.S. Cl. ............ 220/586; 220/582; 220/592; 220/601

(58) Field of Classification Search ......... 220/581–583, 220/585–592, 560.04, 560.09, 560.1, 560.11, 220/506.12, 592.27, 601, 23.9; 244/172.3
See application file for complete search history.

(56) References Cited

U.S. PATENT DOCUMENTS

| | | | | |
|---|---|---|---|---|
| 2,744,043 A * | 5/1956 | Ramberg | .................. | 156/155 |
| 3,122,000 A * | 2/1964 | Sirocky | .................. | 62/45.1 |
| 3,137,405 A * | 6/1964 | Gorcey | .................. | 220/590 |
| 3,140,006 A * | 7/1964 | Nelson | .................. | 220/587 |
| 3,156,100 A * | 11/1964 | Haettinger et al. | .......... | 62/45.1 |
| 3,231,338 A * | 1/1966 | Andrus | .................. | 422/241 |
| 3,289,423 A * | 12/1966 | Berner et. al. | .............. | 62/45.1 |
| 3,392,865 A * | 7/1968 | Dryden | .................. | 220/560.15 |
| 3,487,971 A * | 1/1970 | Gay et. al. | ................ | 220/560.1 |
| 3,695,483 A * | 10/1972 | Pogorski | ................ | 220/592.26 |
| 3,762,175 A * | 10/1973 | Jones | ........................ | 62/45.1 |
| 3,815,773 A * | 6/1974 | Duvall et al. | ................ | 220/590 |
| 3,843,010 A * | 10/1974 | Morse et al. | ................ | 220/590 |
| 3,907,149 A * | 9/1975 | Harmon | .................... | 220/590 |
| 3,908,851 A * | 9/1975 | Jacobs | ...................... | 220/590 |
| 4,170,952 A * | 10/1979 | McCown | .................. | 114/74 A |
| 4,241,843 A * | 12/1980 | Walker et al. | .............. | 220/4.12 |
| 4,313,400 A * | 2/1982 | Walker et al. | .............. | 122/31.1 |

(Continued)

FOREIGN PATENT DOCUMENTS

DE    121 538 A    8/1976

(Continued)

*Primary Examiner*—Anthony Stashick
*Assistant Examiner*—Ned A Walker
(74) *Attorney, Agent, or Firm*—John A. Miller; Miller IP Group, PLC

(57) ABSTRACT

A tank for storing a compressed gas, such as hydrogen, that includes a connection assembly to increase seal integrity. The tank includes an inner gas tight liner and an outer support layer that provides the structural integrity. The connection assembly includes a boss positioned within an opening of the support layer. The inner liner includes a neck portion extending through an internal bore of the boss having an outer collar or flange at an outside surface of the boss. A tank valve is bolted to the boss at an outer perimeter of the collar where a portion of the tank valve extends through the neck portion of the liner and into the tank.

5 Claims, 2 Drawing Sheets

U.S. PATENT DOCUMENTS

| | | | | |
|---|---|---|---|---|
| 4,394,931 | A | * | 7/1983 | Cotgreave et al. ...... 220/560.11 |
| 4,561,568 | A | * | 12/1985 | Hoffmeister et al. ........ 222/130 |
| 4,674,674 | A | * | 6/1987 | Patterson et al. ........... 228/176 |
| 4,700,868 | A | * | 10/1987 | Dirkin ........................ 220/661 |
| 4,773,952 | A | * | 9/1988 | Wesley, Jr. .................. 156/191 |
| 4,785,956 | A | * | 11/1988 | Kepler et al. ................ 220/590 |
| 4,793,491 | A | * | 12/1988 | Wolf et al. .................. 206/509 |
| 4,796,676 | A | * | 1/1989 | Hendershot et al. ........... 141/83 |
| 4,807,833 | A | * | 2/1989 | Pori ........................ 244/159.6 |
| 4,925,044 | A | * | 5/1990 | Hembert .................... 220/589 |
| 4,933,040 | A | * | 6/1990 | Wesley, Jr. .................. 156/191 |
| 4,977,952 | A | * | 12/1990 | Schatz ........................ 165/10 |
| 5,004,120 | A | * | 4/1991 | Hembert .................... 220/589 |
| 5,072,623 | A | * | 12/1991 | Hendershot ................. 73/49.2 |
| 5,253,778 | A | * | 10/1993 | Sirosh ........................ 220/590 |
| 5,287,987 | A | * | 2/1994 | Gaiser ........................ 220/589 |
| 5,287,988 | A | * | 2/1994 | Murray ....................... 220/589 |
| 5,388,720 | A | * | 2/1995 | Murphy ...................... 220/581 |
| 5,397,020 | A | * | 3/1995 | Witt ............................ 73/49.2 |
| 5,429,845 | A | * | 7/1995 | Newhouse et al. .......... 428/34.1 |
| 5,476,189 | A | * | 12/1995 | Duvall et al. ................ 220/590 |
| 5,494,188 | A | * | 2/1996 | Sirosh ........................ 220/590 |
| 5,505,327 | A | * | 4/1996 | Witt ............................ 73/49.2 |
| 5,518,141 | A | * | 5/1996 | Newhouse et al. .......... 220/586 |
| 5,568,878 | A | * | 10/1996 | LeBreton ................. 220/62.19 |
| 5,758,796 | A | * | 6/1998 | Nishimura et al. .......... 220/590 |
| 5,797,513 | A | * | 8/1998 | Olinger et al. ............ 220/592.27 |
| 5,822,838 | A | * | 10/1998 | Seal et al. ................. 29/469.5 |
| 5,938,209 | A | * | 8/1999 | Sirosh et al. ................ 277/622 |
| 5,971,198 | A | * | 10/1999 | Olinger et al. ......... 220/592.27 |
| 5,979,692 | A | * | 11/1999 | West .......................... 220/586 |
| 6,089,399 | A | * | 7/2000 | Felbaum et al. ............. 220/582 |
| 6,135,308 | A | * | 10/2000 | Fang .......................... 220/590 |
| 6,158,605 | A | * | 12/2000 | DeLay .................... 220/62.17 |
| 6,186,356 | B1 | * | 2/2001 | Berkley et al. .............. 220/582 |
| 6,190,481 | B1 | * | 2/2001 | Iida et al. .................... 156/175 |
| 6,193,917 | B1 | * | 2/2001 | DeLay ....................... 264/46.7 |
| 6,227,402 | B1 | * | 5/2001 | Shimojima et al. .......... 220/581 |
| 6,230,922 | B1 | * | 5/2001 | Rasche et al. ............... 220/586 |
| 6,460,721 | B2 | * | 10/2002 | Bowen et al. ............... 220/586 |
| 6,708,502 | B1 | * | 3/2004 | Aceves et al. ................ 62/45.1 |
| 7,032,767 | B2 | * | 4/2006 | Funck ........................ 220/581 |
| 7,032,769 | B2 | * | 4/2006 | Iida et al. .................... 220/591 |
| 7,121,423 | B2 | * | 10/2006 | Sanders ...................... 220/581 |
| 2003/0111473 | A1 | * | 6/2003 | Carter et al. ................. 220/586 |
| 2004/0060304 | A1 | * | 4/2004 | Aceves et al. ................ 62/45.1 |
| 2004/0182869 | A1 | * | 9/2004 | Kubo et al. .................. 220/581 |
| 2004/0206762 | A1 | * | 10/2004 | Iida et al. .................... 220/581 |
| 2006/0169704 | A1 | * | 8/2006 | Brunnhofer ................. 220/581 |

FOREIGN PATENT DOCUMENTS

| | | |
|---|---|---|
| DE | 100 00 705 A1 | 7/2001 |
| DE | 696 16 310 T2 | 1/2003 |
| EP | 0 343 098 A1 | 11/1989 |
| JP | 62-255698 A | 11/1987 |
| JP | 2000/179795 A | 6/2000 |
| JP | 2000/266288 A | 9/2000 |

\* cited by examiner

HYDROGEN PRESSURE TANK INCLUDING AN INNER LINER WITH AN OUTER ANNULAR FLANGE

BACKGROUND OF THE INVENTION

1. Field of the Invention

This invention relates generally to a pressure tank and, more particularly, to a hydrogen pressure tank that includes a specially designed connection assembly for providing a gas to or removing the gas from the tank, while maintaining a gas tight seal.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

Typically hydrogen is stored in a compressed gas tank under high pressure on the vehicle to provide the hydrogen necessary for the fuel cell system. The pressure in the compressed tank can be upwards of 700 bar. In one known design, the compressed tank includes an inner plastic liner that provides a gas tight seal for the hydrogen, and an outer carbon fiber composite layer that provides the structural integrity of the tank. At least one pressure regulator is typically provided that reduces the pressure of the hydrogen within the tank to a pressure suitable for the fuel cell system.

As the hydrogen is removed from the compressed tank, the pressure of the hydrogen in the tank will decrease. When the pressure of a gas is reduced and the volume does not change, the temperature of the gas will also decrease. The effect of the decrease in the temperature will be limited because heat is transferred from the environment into the tank. If the flow rate of the hydrogen flowing out of the tank is high enough and/or the temperature of the environment is low enough, the temperature in the tank can fall below −80° C. Typically it is possible to limit the hydrogen flow rate so that −80° C. is the lowest temperature that occurs within the tank. Further, when the tank is being filled with hydrogen, the temperature of the hydrogen can increase to 80° C. due to the compression of the hydrogen inside of the tank, providing a temperature swing of −80° C. to 80° C. The materials that can seal hydrogen in this temperature range are difficult to produce.

If the temperature of the hydrogen within the tank decreases beyond a certain temperature, such as −80° C. around the liner and −40° C. at the tank seals, including O-rings and other sealings, the materials become brittle and possibly damaged, affecting the tank's gas tight performance. Therefore, there are limits as to how fast hydrogen and/or for how long hydrogen can be removed from the compressed tank in a fuel cell system.

FIG. 1 is a cut-away, cross-sectional view of a compressed hydrogen storage tank 10 of the type discussed above. The tank 10 includes an outer structural layer 12 typically made of a graphite composite and an inner liner 14, typically made of a durable plastic, such as a high density polyethylene. The liner 14 provides the gas tight environment for the hydrogen, and the outer layer 12 provides the structural integrity for the compressed hydrogen gas. A metal boss 22, typically stainless steel, is provided between an opening 24 in the outer layer 12 and a neck portion 20 of the liner 14. An adapter 18 is mounted in the neck portion 20 of the liner 14 where a flange 26 of the adapter 18 abuts against an end of the neck portion 20, as shown. The adapter 18 is fitted in the tank 10 and remains in place. A connector 16 is threaded into an outer end of the boss 22 to be positioned against the flange 26. The connector 16 may also extend through the adapter 18 into the liner 14. The connector 16 may contain certain components, such as valves and sensors. The boss 22 is configured to be securely held between the outer layer 12 and the liner 14, to securely hold the adapter 18 to the neck portion 20, and to securely hold the connector 16 within the boss 22. An O-ring 28 provides a seal between the neck portion 22 of the liner 14 and the adapter 18. Additionally, an O-ring 30 provides a seal between the flange 26 and end of the connector 16, as shown. The O-rings 28 and 30 help provide the sealing between the various elements of the connection area; especially at lower pressures. Other tank designs use O-rings at other locations.

It is important that the compressed hydrogen stored in the tank be prevented from leaking or diffusing out of the tank. Because hydrogen is a light and diffusive gas, sealing the leaks is typically difficult, especially around the connection area to the outside of the tank. Thus, it is desirable to reduce the number of seals and the complexity of the connection area. Also, typically the connecting structures in the tank are made of different materials, which also makes the sealing even more difficult.

SUMMARY OF THE INVENTION

In accordance with the teachings of the present invention, a tank is disclosed for storing a compressed gas, such as hydrogen, that includes a specially designed tank connection assembly to increase seal integrity. The tank includes an inner gas tight liner and an outer structural layer that provides the structural integrity. The connection assembly includes a boss positioned within an opening of the structural layer. The inner liner includes a neck portion extending through an internal bore of the boss that includes an outer collar or flange outside of the boss. A tank valve is bolted to the boss at an outer perimeter of the collar where a portion of the tank valve extends through the neck portion of the liner and into the tank. An O-ring can be provided between the valve base portion and the collar to increase the sealing integrity, and a flat seal can be provided around bolts to further increase sealing integrity.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a compressed gas tank system and tank connection assembly is merely exemplary in nature, and is in no way intended to limit the invention or its applications or uses.

Figure 1:
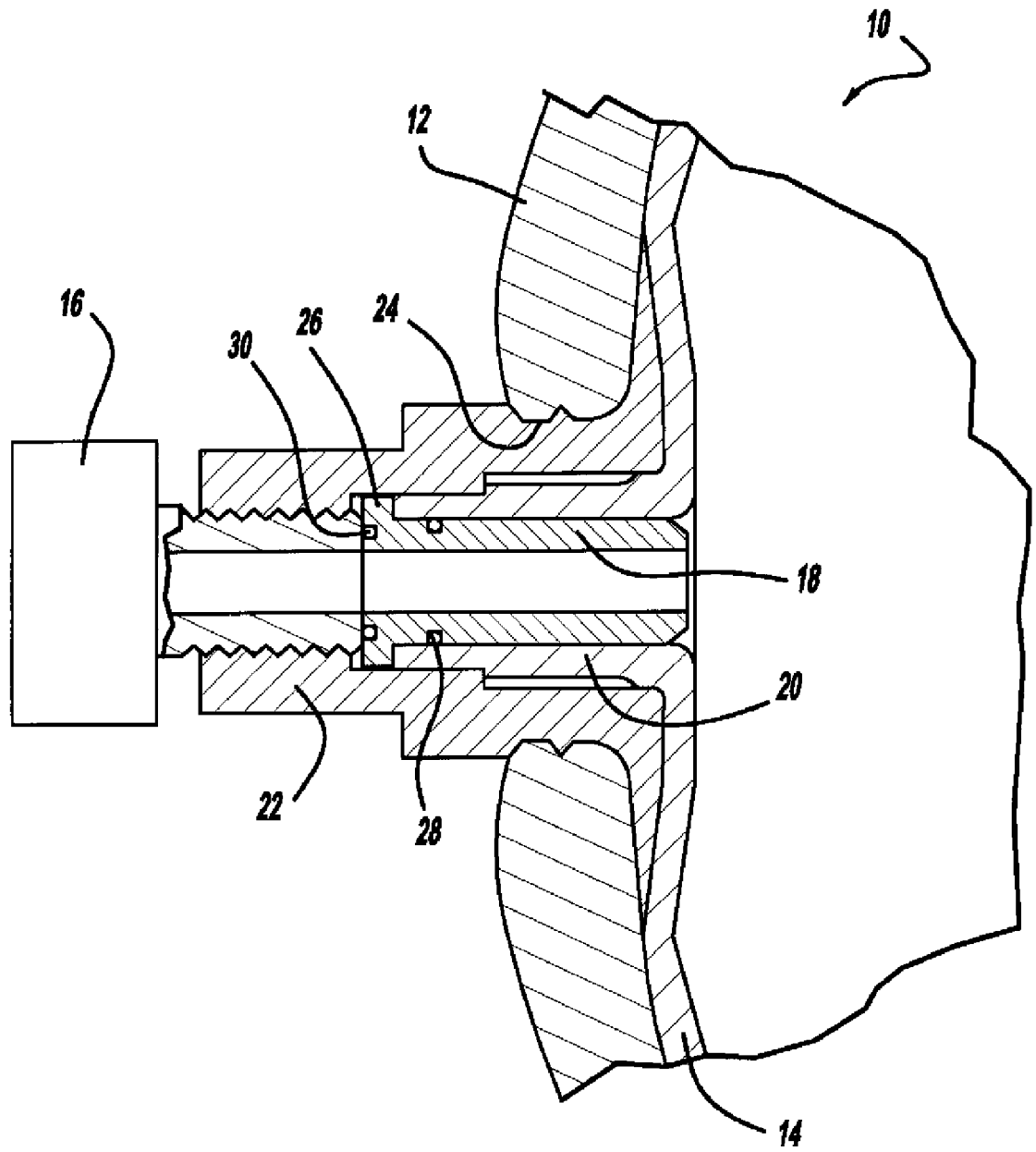
FIG. 1 is a cut-away, cross-sectional view of a known compressed hydrogen tank including a connection assembly attached thereto.
Figure 2:
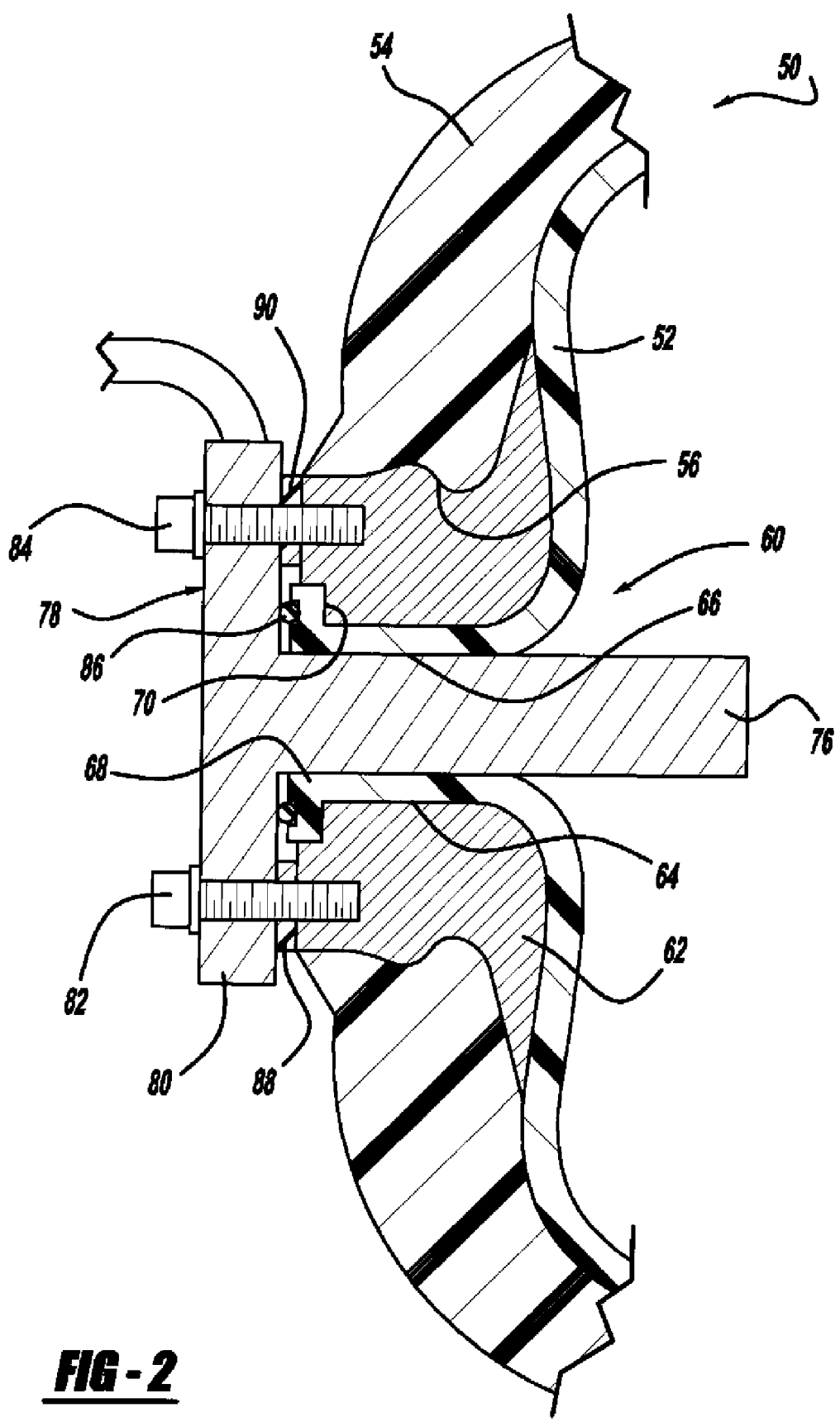
FIG. 2 is a cut-away, cross-sectional view of a compressed gas tank including a tank connection assembly, according to an embodiment of the present invention.

FIG. 2 is a cut-away, cross-sectional view of a connection area of a compressed gas tank 50 that has particular application for a compressed hydrogen storage tank for a fuel cell system, according to an embodiment of the present invention.

The tank 50 includes an inner liner 52 made of a suitable material, such as a high density polyethylene. The tank 50 also includes an outer structural layer 54 made of a suitable structural material, such as a graphite composite. The liner 52 provides the gas tightness of the tank 50 and the outer layer 54 provides the structural integrity of the tank 50, where the outer layer 54 is not gas tight. An opening 56 is provided in the structural layer 54 where the hydrogen gas is provided to and removed from the tank 50.

According to the invention, the tank 50 includes a tank connection assembly 60 that is less complex and more reliable than those known in the prior art to provide a gas tight environment at the high pressures and wide temperature ranges discussed above. The connection assembly 60 includes an annular boss 62 having a special configuration to conform to the opening 56 between the outer layer 54 and the liner 52, as shown. In one embodiment, the annular boss 62 is a metal boss, such as stainless steel, however, other materials may be suitable for this purpose. The annular boss 62 includes a center bore 64. The liner 52 includes a neck portion 66 extending through the bore 64, as shown. The neck portion 66 includes an annular flange or collar 68 formed in an annular groove 70 of the boss 62, as shown. Thus, the liner 52 includes a portion that extends to an outer edge of the tank 50 to increase the seal integrity.

An elongated portion 76 of a shut-off valve assembly 78 is inserted into the neck portion 66 so that a base portion 80 of the assembly 78 is positioned proximate an outer surface of the boss 62, as shown. Bolts 82 and 84 are threaded through the base portion 80 and into the boss 62 to hold the valve assembly 78 to the tank 50. An O-ring 86 is provided between the base portion 80 and the collar 68 to help maintain the seal integrity of the liner 52. Additionally, sealing washers 88 and 90 can be provided around the bolts 82 and 84, respectively, to further increase the seal integrity of the tank 50.

The boss 62 can be a single piece boss formed between the outer layer 54 and the liner 52 or a divided boss made of two (or more) boss pieces that are assembled to the neck portion 66 in the opening 56. If the boss 62 is a single piece unit, it can be positioned in the liner mold so that the neck portion 66 is formed around the boss 62 during a rotomolding process, or other production processes, that may be used to manufacture the liner 52. If the boss 62 is a divided boss, then it can be assembled to the liner 52 as a separate step once the liner 52 is produced. Additionally, the liner 52 can be molded as two separate parts, including a vessel part and the neck portion 66. In this manufacturing process, the boss 62 can be molded to the neck portion 66 and later welded to the vessel part of the liner 52.

The tank connection assembly 60 offers a less complex and more easily manufacturable connection area for the tank 50 that reduces the potential for hydrogen leaks from the tank in the liner 14. The design of the liner 52 provides increased sealing integrity as a result of the annular collar 68 extending around an outer edge of the neck portion 66 and being formed to the boss 62. This allows the O-ring 86 that provides the seal integrity to be moved away from the area where the hydrogen is flowing out of the valve assembly 78. Thus, for high flow rates, the O-ring 86 is separated from the cold temperature of the hydrogen, which may otherwise affect the seal integrity.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A high pressure tank assembly for storing compressed hydrogen, said tank assembly comprising:
   an outer structural layer defining an opening;
   an annular metal boss positioned within the opening and having an internal bore, said boss including an annular groove at an outside face of the boss;
   an inner liner layer positioned within the outer structural layer and providing a gas tight environment, said inner liner layer including a neck portion extending through the internal bore of the boss, said neck portion including an outer annular flange positioned within the annular groove of the boss at a location outside of the outer layer, said outer annular flange extends outwardly beyond the boss and the outer layer, said outer layer completely enclosing an outside surface of the boss opposite to the internal bore of the metal boss and the neck portion of the inner liner layer; and
   a tank valve mounted to a front face of the boss and extending through the neck portion of the liner.

2. The tank assembly according to claim 1 wherein the boss is a single piece boss.

3. The tank assembly according to claim 1 wherein the boss is a divided boss including a plurality of boss pieces.

4. The tank assembly according to claim 1 further comprising an O-ring positioned between a base portion of the tank valve and the annular flange to provide a sealed environment.

5. The tank assembly according to claim 1 wherein the liner layer is made of a plastic and the outer layer is made of a graphite composite material.

\* \* \* \* \*